UNITED STATES PATENT OFFICE.

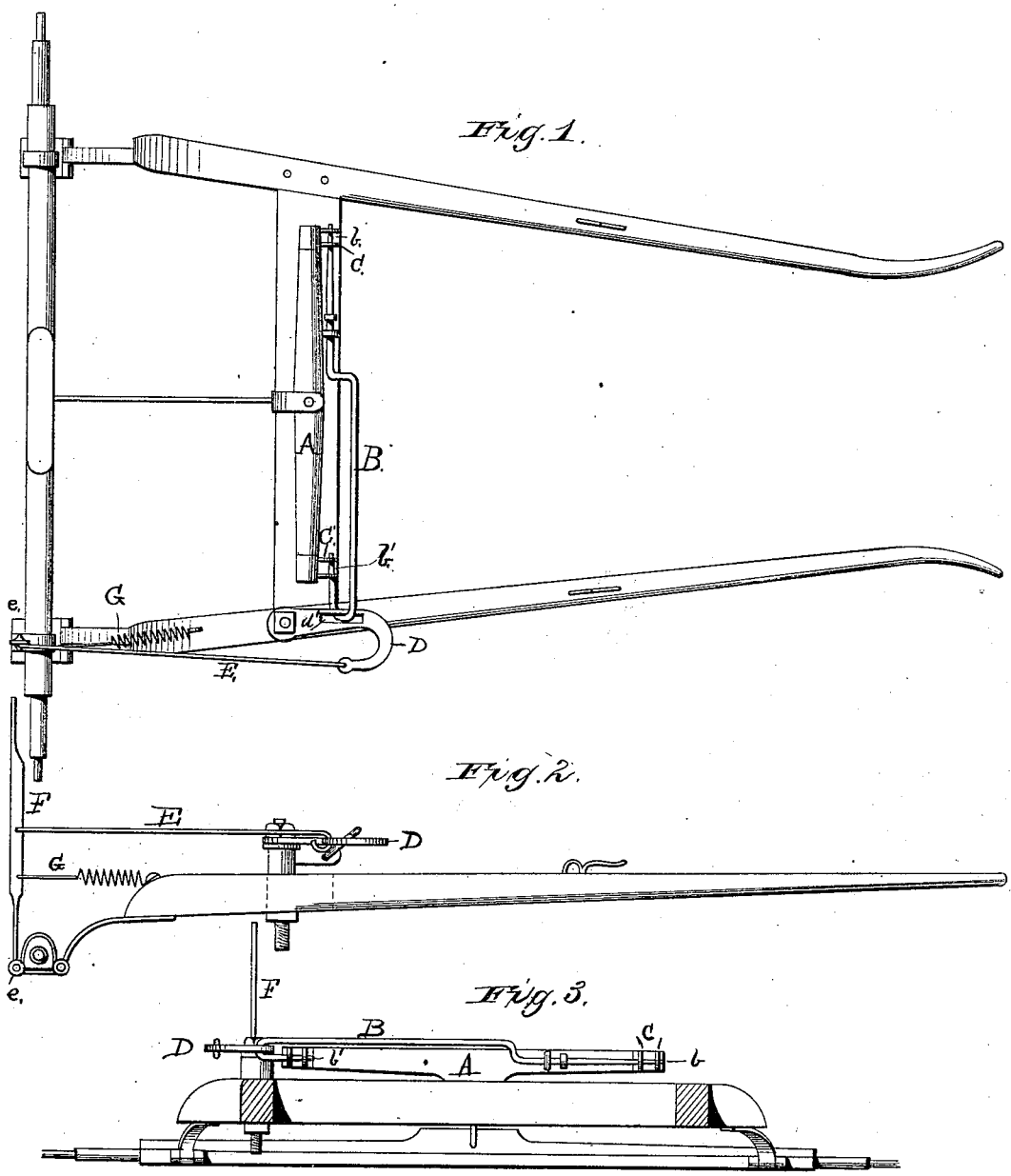

WILLIAM H. PETREE, OF FORSYTH COUNTY, NORTH CAROLINA.

IMPROVEMENT IN HORSE-DETACHERS.

Specification forming part of Letters Patent No. 215,965, dated May 27, 1879; application filed April 29, 1879.

*To all whom it may concern:*

Be it known that I, W. H. PETREE, of the county of Forsyth and State of North Carolina, have invented certain new and useful Improvements in Horse-Detaching Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a top plan of the front axle and shafts of a vehicle, with accompanying devices, fully illustrating my invention. Fig. 2 is a side elevation of same; and Fig. 3 is a front view.

This invention has relation to devices for detaching horses from vehicles; and to that end it consists of certain improvements in the construction of the same, hereinafter more fully described, and particularly pointed out in the claims.

In the accompanying drawings similar letters of reference indicate like parts of the invention.

To the whiffletree A of an ordinary pair of thills is attached a sliding bent rod, B, the ends $b\ b'$ of which pass through pairs of ears C C' at the opposite ends of said whiffletree. A bent lever, D, has a slot, $d$, in which works the sliding rod B. A connecting-rod, E, is attached to the lever D, and extends backward to an operating-handle, F, the upper end of which is in reach of the driver of the vehicle. The lower end of this handle F is attached to the rear part of the thill-coupling, which has an extension, $e$, for that purpose.

A spring, G, is attached to the handle F, connecting it with the right-hand thill in such a manner as will cause said handle to be thrown forward, thus keeping the hames fastened to the ears C C'.

It will readily be seen from this construction that by pulling the handle F backward the traces will be detached, and the horse allowed to go clear of the vehicle.

It will also be seen that as the operating-handle F is attached to the axle, thus making it stationary, if the thill-straps are loosened and the thills allowed to drop, the operation of the falling of the thills will cause the lever D to be operated by reason of the distance between it and the handle F being increased, consequently detaching the traces, thus freeing the horse as before.

Having thus described my invention, what I claim as new and useful, and desire to secure by Letters Patent of the United States, is—

1. In a horse-detaching device, the bent rod B, lever D, having slot $d$, connecting-rod E, and handle F, substantially as and for the purpose set forth.

2. In a horse-detaching device, the handle F, secured to the front axle of a vehicle, in combination with the connecting-rod E and the bent lever D, provided with slot $d$, and the detaching-rod B, secured to the thills of the vehicle, substantially as and for the purpose set forth.

In testimony that I claim the foregoing I have hereunto set my hand.

W. H. PETREE.

Witnesses:
D. H. STARBUCK,
W. H. WHEELER.